(12) United States Patent
Starr et al.

(10) Patent No.: US 7,486,462 B1
(45) Date of Patent: Feb. 3, 2009

(54) AVAILABLE LIBRARY CAPACITY

(75) Inventors: Matthew Thomas Starr, Lafayette, CO (US); Michael Gerard Goberis, Broomfield, CO (US)

(73) Assignee: Spectra Logic Corporation, Denver, CO (US)

( * ) Notice: Subject to any disclaimer, the term of this patent is extended or adjusted under 35 U.S.C. 154(b) by 0 days.

(21) Appl. No.: 11/923,650

(22) Filed: Oct. 24, 2007

(51) Int. Cl.
*G11B 19/02* (2006.01)

(52) U.S. Cl. ...................................... 360/69

(58) Field of Classification Search .......... None
See application file for complete search history.

(56) References Cited

U.S. PATENT DOCUMENTS

| | | | |
|---|---|---|---|
| 6,425,042 B1 | 7/2002 | Ikeda et al. | |
| 6,817,563 B2 * | 11/2004 | Iino | 242/348 |
| 2003/0067702 A1 * | 4/2003 | Iles et al. | 360/69 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0052772 A1 | 3/2005 | Barbian et al. | |
| 2006/0164928 A1 | 7/2006 | Starr et al. | |
| 2007/0195447 A1 | 8/2007 | Starr et al. | |
| 2007/0206308 A1 * | 9/2007 | Bates et al. | 360/55 |

OTHER PUBLICATIONS

U.S. Appl. No. 11/412,565, filed Apr. 27, 2006, Starr et al.

\* cited by examiner

*Primary Examiner*—Andrew L. Sniezek

(57) ABSTRACT

A data storage library is described including a plurality of tape cartridges each of which substantially houses a tape medium with a known storage capacity that includes both available storage space for storing new user data and consumed storage space which contains previously stored user data. Each tape cartridge also possesses an associated auxiliary memory device adapted to acquire and maintain knowledge of the available storage space relative to the associated tape cartridge. The library further includes at least one tape drive capable of writing the new user data and reading the previously stored user data from the tape medium. The tape drive can transfer the knowledge of the available storage space remaining on each of the tape cartridges to the auxiliary memory device associated with each of the tape cartridges which can then be transferred a user of data immediately or at a later time.

20 Claims, 14 Drawing Sheets

640

642  644  646  648

| Magazine Bar code SN | Storage Capacity | Available Space | Action |
|---|---|---|---|
| MAAA | 10 Terabytes | 7% | Replace |
| MAAF | 20 Terabytes | 4% | Replace |
| MAAX | 10 Terabyte | 2% | Replace |

FIG. 6C

AVAILABLE LIBRARY CAPACITY

CROSS-REFERENCE TO RELATED APPLICATIONS

None.

BACKGROUND OF THE INVENTION

1. Field of the Invention

The present invention relates generally to tape libraries using auxiliary memory devices contained in tape storage cartridges in tape libraries to record information related to available tape cartridge storage space.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as tape capacity, manufacturer, etc. Today, these techniques are yielding to the introduction of Radio Frequency chips disposed in the tape cartridges called a Memory-In-Cartridge (MIC) or Medium Auxiliary Memory (MAM), because of increased amounts of information and ease of use. FIG. 1A shows an example of a tape cartridge 100, tape medium 102, and MIC 104, shown here in dashed lines because the MIC 104 and tape medium 102 reside in the interior of the cartridge 100. In this example, the MIC is disposed in an LTO-3 cartridge which can be provided by TDK Corp. of Tustin, Calif.

A MIC allows the tape drive to access valuable cartridge data without the use of a physical connection, reducing connector wear for both the drive and the media. The MIC is a memory chip built into the data cartridge that provides a direct and immediate connection to the drive's on-board processors, which speeds access to information related to the data cartridge such as system logs, for example. Information and file search parameters are formatted within the MIC system effectively cutting the data access time down to a fraction from historical techniques.

As shown in FIG. 1B, a MIC 104 fundamentally comprises an integrated circuit that includes solid state memory and a transponder 124 attached to an antenna 126, the antenna is typically a small coil of wires. The MIC 104 is considered a passive device because it is energized when subjected to a strong enough RF field produced by a MIC-Reader. Information can be transmitted between the MIC and the MIC-Reader via a specific radio frequency.

Currently a MIC, or MAM, is parceled into regions for a medium, device and host. The three regions can accommodate attributes related to a medium with a MIC. For example a medium attribute can be a serial number permanently stored in the MAM during manufacturing, a device attribute can be load count maintained by the tape drive and a host attribute can be a backup date maintained by the application client. These attributes are strictly read and written to by a reader disposed in a drive.

In an effort to expand capabilities of a storage element containing a MIC operable with a data storage unit as it pertains to available storage space in a cartridge and/or library at substantially any given time, both methods and apparatus are disclosed herein. It is to innovations related to this subject matter that the claimed invention is generally directed.

SUMMARY OF THE INVENTION

The present invention relates generally to tape libraries using auxiliary memory devices contained in tape storage cartridges in tape libraries that overcomes the disadvantages and limitations of the prior art by using at least one radio frequency memory device to read auxiliary memory devices that is independent of that which is used in a tape drive. One embodiment of the present invention can therefore comprise a a plurality of tape cartridges each substantially housing a tape medium with a known storage capacity, the known storage capacity comprising consumed storage space and available storage space wherein the consumed storage space contains previously stored user data and the available storage space is available for storing new user data, and wherein each of the tape cartridges possesses an associated auxiliary memory device; at least one tape drive capable of cooperating with each of the plurality of tape cartridges to write the new user data to the tape medium housed in each of the tape cartridges and capable of transferring knowledge of the available space to the auxiliary memory device associated with each of the tape cartridges; a designated memory device for receiving and storing the knowledge from the auxiliary memory device associated with each of the tape cartridges; and an informing means for providing collectively the knowledge of the available storage space for at least two of the plurality of tape cartridges to a user of data.

Other embodiments of the present invention may additionally comprise a tape storage library comprising: a first tape cartridge and a second tape cartridge each possessing a tape medium with known storage capacity, the known storage capacity comprising consumed storage space and available storage space, each of the tape cartridges further possessing an auxiliary memory device adapted to acquire and maintain knowledge of how much available storage space exists on each of the tape cartridge; at least one tape drive capable of writing new user data to the tape media associated with the first and second tape cartridges; and a means for providing the knowledge from the auxiliary memory device associated with the first tape cartridge and the auxiliary memory device associated with the second tape cartridge to a user of data wherein the knowledge is in a cumulative form.

Yet further embodiments of the present invention may comprise a method comprising the steps of: providing a library with a tape drive, a first tape cartridge with a first auxiliary memory device possessing knowledge of first available storage space, a second tape cartridge with a second auxiliary memory device possessing knowledge of second available storage space; reading the knowledge of the first available storage space; transmitting the knowledge of the first available storage space to a predetermined location; reading the knowledge of the second available storage space; transmitting the knowledge of the second available storage space to the predetermined location; storing the knowledge of the first and the second available storage space to the predetermined location; generating at least an average of the knowledge of the first and the second available storage space; transmitting the at least an average of the knowledge to a display readable by an end user.

BRIEF DESCRIPTION OF THE DRAWINGS

FIG. 6A-6C shows various embodiments of a displayed data table pertaining to storage capacity and available storage space related information relative to that recorded on auxiliary radio frequency memory devices in accordance with an embodiment of the present invention.

DETAILED DESCRIPTION

Figure 2A:
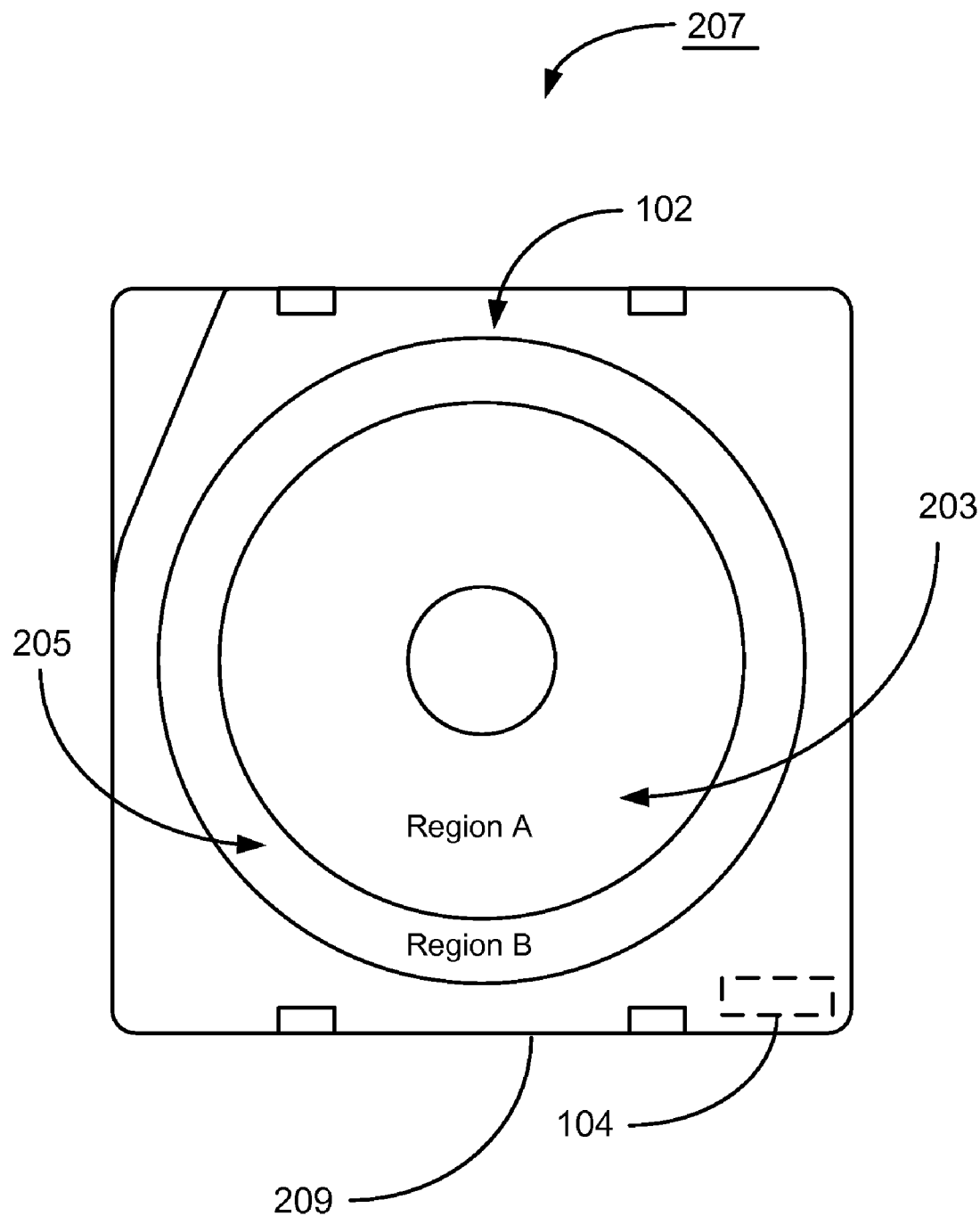
FIG. 2A is an illustration of a tape cartridge arrangement comprises a magnetic recording tape medium showing both consumed and available storage space constructed in accordance with an embodiment of the present invention.

Referring to the drawings in general, and more specifically to FIG. 2A, shown therein is a block diagram of a data cartridge arrangement constructed in accordance with an embodiment of the present invention. In what follows, similar or identical structures may be identified using identical call-outs.

The tape cartridge arrangement 207 comprises a magnetic recording tape medium 102 and an auxiliary radio frequency memory device 104, both substantially encased in a cartridge housing 209. The tape medium 102 is shown in solid lines to better illustrate tape usage of region A 203 and region B 205. Here, tape region A 203 is the amount of available space for storing new user data and tape region B 205 is the amount of consumed storage space that contains previously stored user data. User data is data intended to be stored in a tape cartridge 207 by a user of data, such as the user of data 202 shown in FIG. 2B. Therefore, the known storage space is substantially the cumulative total of consumed storage space 205 and the available storage space 203 (not necessarily considering tape header information or the like). For example, in the case where the known storage capacity of the tape medium 102 is one terra-byte and the tape medium 102 has 300 mega-bytes of previously stored user data (region B 205), the available space (region A 203) is 700 mega-bytes, thus, 30% of the tape cartridge's capacity has been used. In one embodiment of the present invention, the auxiliary radio frequency memory device 104 can possess knowledge of the available storage space, region A 203, remaining on the tape cartridge 207. Alternatively, the auxiliary radio frequency memory device 104 can possess knowledge of the amount of consumed storage space, region B 205, associated with the tape cartridge 207. In another embodiment, knowledge of available storage space, region A 203, consumed storage space, region B 205, capacity and/or other calculations of space relationships associated with the tape cartridge 207 can be stored on the auxiliary radio frequency memory device 104 as well.

Figure 1A:
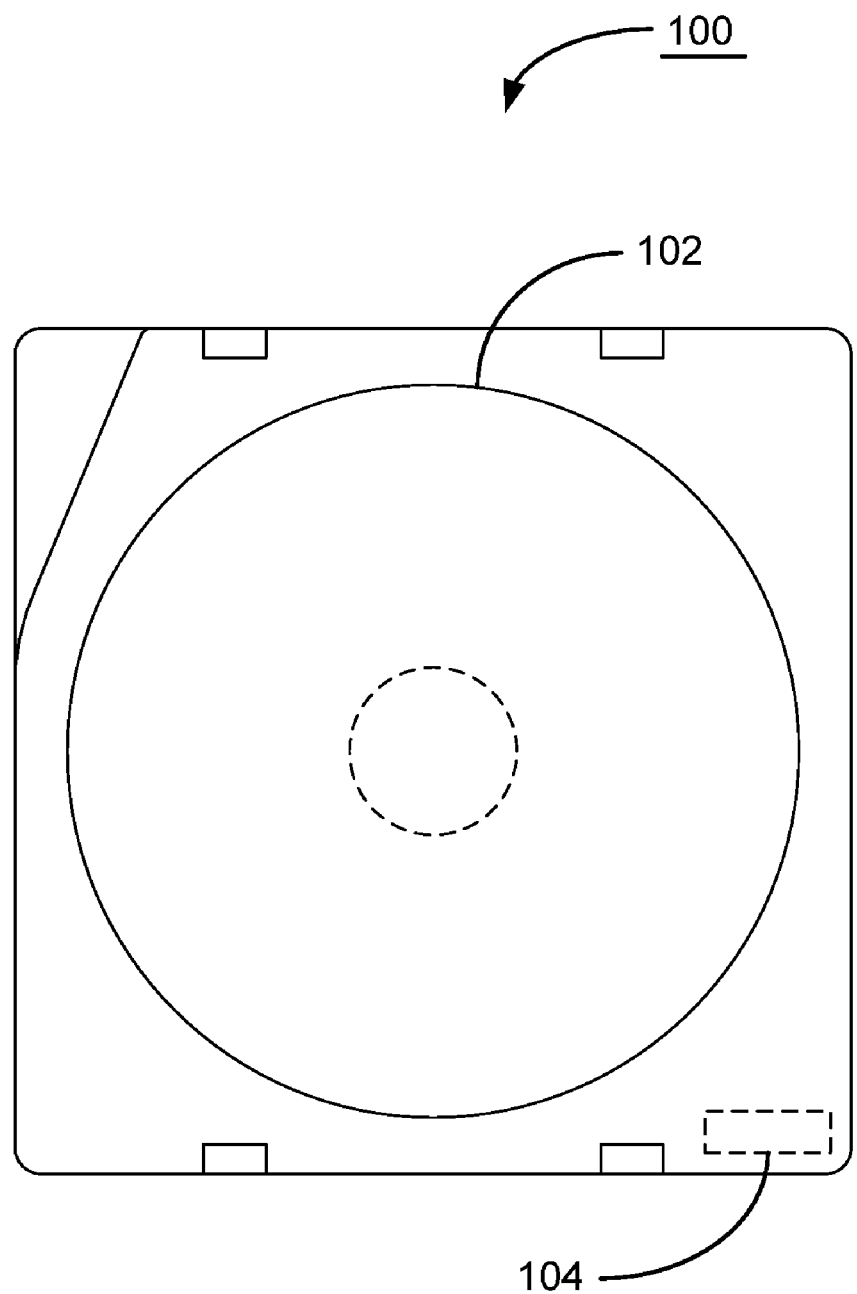
FIG. 1A is a prior art pictorial representation of a tape cartridge with an auxiliary radio frequency memory device.
Figure 1B:
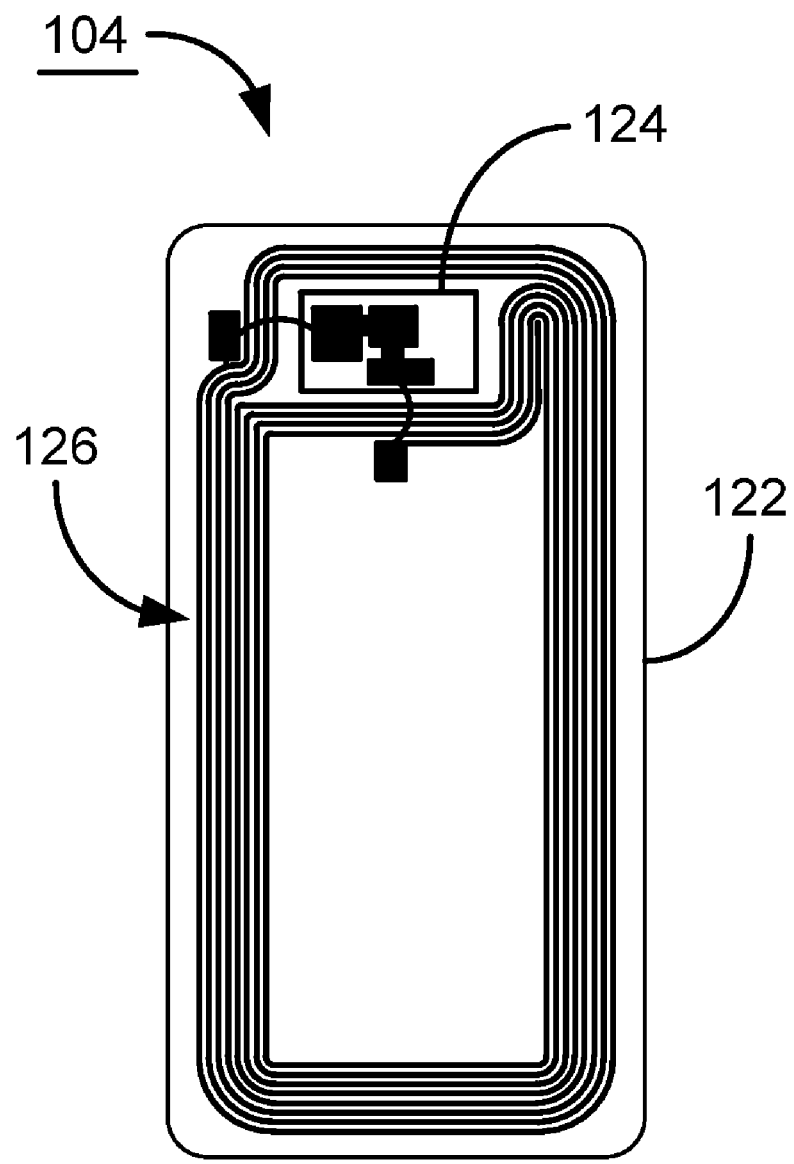
FIG. 1B is a prior art pictorial representation of an auxiliary radio frequency memory device.
Figure 2B:
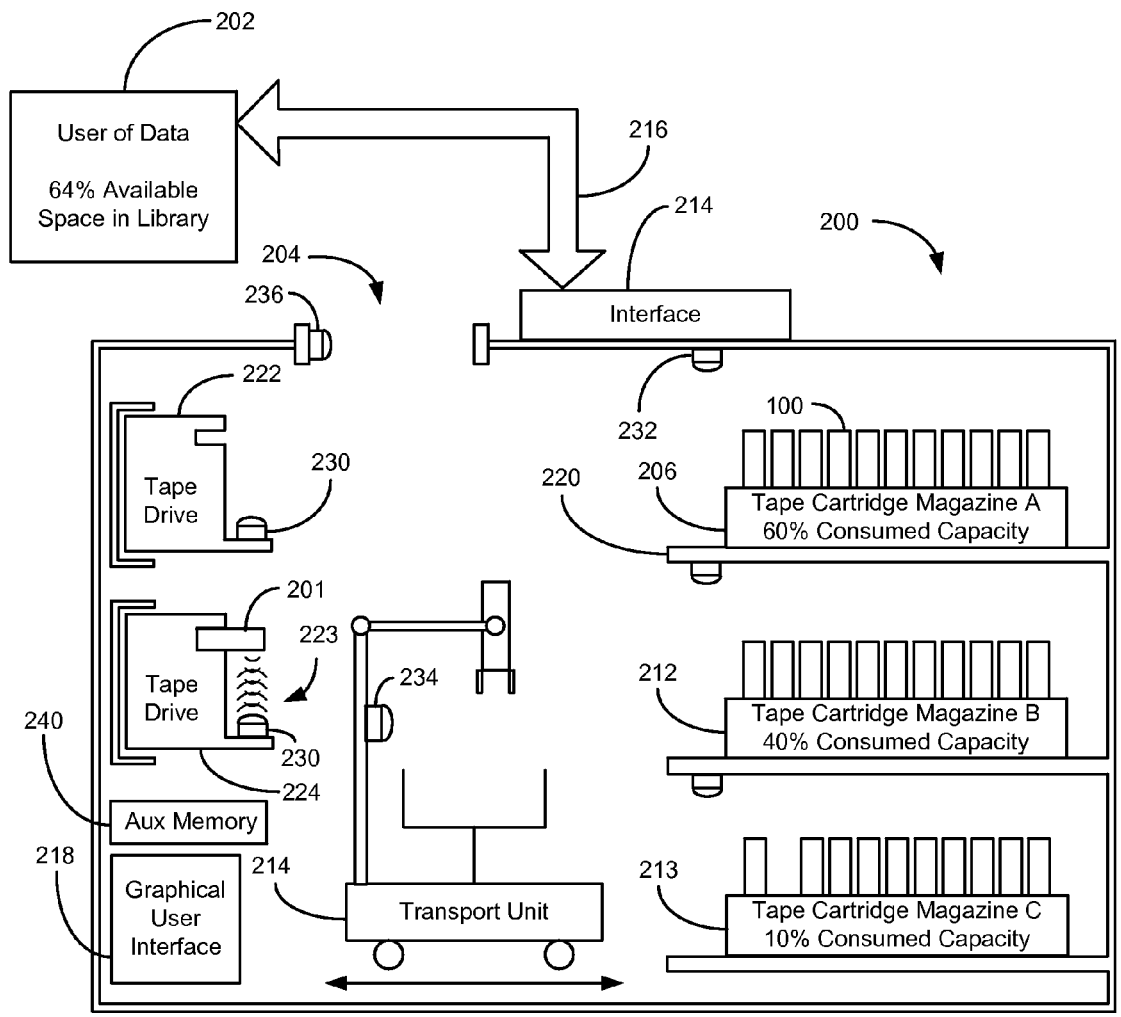
FIG. 2B is an illustration of a data storage arrangement constructed in accordance with an embodiment of the present invention.

The data storage arrangement illustrated in FIG. 2B can comprise a user of data 202, such as a client, in communication with a data storage library 200. As illustratively shown, the client 202 is in communication with the library 200 via a communication path 216 and a library interface device 214. The library 200 comprises a plurality of tape cartridges 100 disposed in a tape cartridge magazine, such as tape magazine 206, wherein each of the tape cartridges contains an auxiliary radio frequency memory device (not shown) capable of storing auxiliary digital data, such as the MIC 104 of FIG. 1B. The tape magazine 206 will be used throughout this document to represent a generic tape magazine unless otherwise noted. In this embodiment, the library 200 also comprises several tape drives 222 and 224, each capable of reading and writing data to and from one of a plurality of tape cartridges 100. Each tape drive 222 and 224 can be associated with a tape drive radio frequency memory device 230. As shown here, the loaded tape drive 224 is in radio frequency communication 223 with the auxiliary radio frequency memory device 104 (not shown) associated with tape cartridge 201 via the tape drive radio frequency memory device 230 associated with tape drive 224. Such communication 223 can include remaining available storage space information after writing user data to the tape 201. The library 200 can further comprise a shelving system 220 capable of archiving the tape cartridge magazines 206, 212 and 213 within the library 200. In this embodiment, the shelving system 220 is associated with one or more auxiliary radio frequency memory device readers 232 is capable of at least reading data stored on an auxiliary radio frequency memory device 104 contained by each tape cartridge 100. A transport unit 214 comprises means to transport a tape cartridge magazine 206 from the shelf system 220 to a location that facilitates a tape cartridge 100 to be inserted in one of the drives 222 or 224, such as tape cartridge 201 in a cooperating relationship with drive 224 to read and write data as shown. The transport device 214 can optionally be associated with at least one auxiliary radio frequency memory device reader 234, as shown here, disposed on the transport unit 214. The library 200 also optionally comprises an entry/exit port 204 whereby tape cartridges 100 or tape cartridge magazines 206 can be transferred between an environment external to the library 200 and an environment internal to the library 200. As shown here, preferably at least one auxiliary radio frequency memory device reader 236 is associated with the entry/exit port 204. In this embodiment, the library 200 can accommodate a graphical user interface 218 and an auxiliary memory 240, such as a disk drive or solid state memory device, capable of storing relevant information related to each tape 100, such as that which is stored on an auxiliary radio frequency memory device 104. The auxiliary memory device 240 and/or graphical user interface 218 are linked to each reader, such as the reader 230, via a linking means such as a cable or some other wireless device for example, through which a reader, such as the reader 230, transmits the information stored on an auxiliary radio frequency memory device 104.

As further shown in FIG. 2B, tape magazine A 206 comprises tape cartridges 100 that have a 60% cumulatively consumed capacity, that is, the aggregate of all the tapes cartridges 100 that make up magazine A 206 possess 40% space left available for storing new user data. Tape magazine B 212 comprises tape cartridges 100 that have a 40% cumulatively consumed capacity, and tape magazine C 213 comprises tape cartridges 100 that have a 10% cumulatively consumed capacity. Consequently, if the library 200 only comprises tape cartridge magazine A 206, magazine B 212 and magazine C 213, then the total available storage space in the library 200 as calculated in a cumulative form is about 64% (consumed is about 36%), assuming all magazines have the same number of tapes cartridges 100 each with the same capacity. Storage capacity related information, such as the amount of available space remaining after storing some amount of user data to a cartridge 100, can be acquired and maintained by an associated auxiliary radio frequency memory device 104 via a means for transferring the storage capacity related information such as the tape drive radio frequency memory reader and writer device 230 instructed by an algorithm associated with the tape drive 224, for example. Storage capacity related information stored on each auxiliary radio frequency memory device 104 associated with each tape cartridge 100 can be read via one of the radio frequency memory device readers 230, 232, 234 and 236, or some other informing means that provides the knowledge of available storage space and transmitted to the auxiliary memory device 240 (or to a different local, such as directly to a user of data 202) wherein total library available storage capacity can be tallied and sent to a means for providing the information such as the graphical user interface 218 or to the user of data 202 or both, for example. In an optional embodiment, the available storage capacity, or all related storage capacity information, of each data cartridge can be transmitted directly to the auxiliary memory device 240 wherein the auxiliary radio frequency memory devices 104 are simply bypassed, or if the data cartridges do not have an auxiliary radio frequency memory device 140, then that information can be sent to the auxiliary memory device 240 (or some other storage location possibly remotely from the library 200), for example. Storage capacity statistics can be advantageously used by a user of data 202, for example, to optimize storage consumption of tapes 100 in the library 200 before used tape cartridges 100 should be sent to a vault and exchanged with new tape cartridges 100, wherein a vault may archive old tape cartridges 200 indefinitely. Optionally, storage capacity information can be advantageously used by a user of data 202, for example, to alternatively add more capacity by adding additional libraries or new tape cartridges 100. In yet another example, a user of data 202, or host, can determine via available storage space statistics what the average consumption percentage is for removed tape cartridges 100 and/or magazines 206. Optionally, a user of data 202, or host, can determine via available storage space statistics what the average consumption percentage is for tape cartridges 100 or magazines 206 in a library at any given time. Such information can be generated by an algorithm that manages the removal of a tape cartridge 100 based on the minimum acceptable amount of available space remaining on the tape cartridge 100. In one embodiment, the tape cartridges 100 or the tape cartridge magazines may be associated with different users of data such that the storage space in the library 200 is partitioned into two or more parts wherein each part is associated with the different user of data for example. A partition comprises a percentage of tape cartridges 100 or magazines 206 in a library 200. Statistics relative to available storage space in a given partition can be provided to the associated user of data assigned to that partition.

Figure 2C:
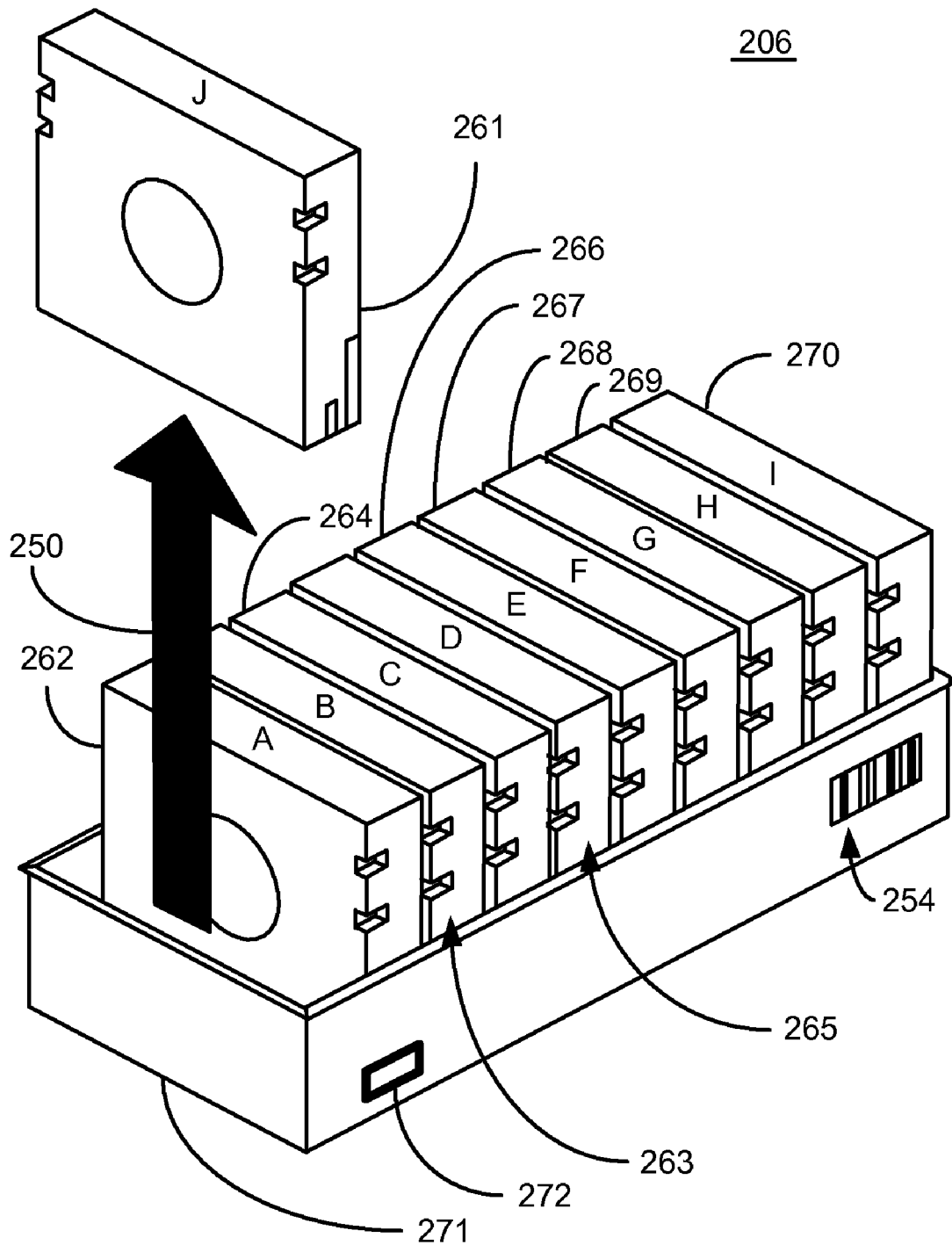
FIG. 2C is an illustration of a populated tape cartridge magazine in accordance with an embodiment of the present invention.

With reference to FIG. 2C, shown therein are a plurality of tape cartridges supported by a tape cartridge magazine 271. In more detail, a tape cartridge, such as tape cartridge 201 can be an LTO3 category tape cartridge manufactured by IBM of Armonk, N.Y., which comprises magnetic tape that is capable of storing digital data written by a compatible drive 220 or 224, such as an LTO tape drive manufactured by IBM, when in cooperation (i.e. loaded) with the tape cartridge 201 as shown in FIG. 2A. A tape cartridge, such as tape cartridge F 261, can be removed from the tape cartridge magazine 271, as shown by the arrow 250, and inserted in to the tape drive 220 or 224 by means of a picker device 402, shown in FIG. 4. Disposed on the tape cartridge magazine 252 is a bar code identifier 254, or other identifying indicia, for identifying the tape cartridge magazine 206 which has utility should the tape cartridge magazine 206 be archived in a media pack storage vault, for example. In this embodiment, tapes A 262, C 264, E 266, G 268 and 1270 may each have 30% available storage space while tapes B 263, D 265, F 267, H 269 and J 261 may have 50% available space. Cumulatively, the magazine 271 comprises 40% available storage space. In this embodiment, all tape cartridges contain an auxiliary radio frequency memory device 104, however, in alternative embodiments, some tape cartridges may not contain an auxiliary radio frequency memory device 104. In yet another embodiment, the tape cartridge magazine 271 can comprise a magazine auxiliary radio frequency memory device 272 that can store at least the storage capacity of the tape cartridges that are populated in the magazine 271. The tape cartridge magazine auxiliary radio frequency memory device 272 can optionally store the aggregate available storage space of the tape cartridges, the capacity of the tape cartridges, each individual tape cartridge, and other information such as magazine indicia, performance and/or historical event related data related with each tape cartridge, as discussed later. The tape cartridge magazine auxiliary radio frequency memory device 272 can potentially provide more storage space than an auxiliary radio frequency memory device 104. The magazine auxiliary radio frequency memory device 272 can further be used with alternative mobile storage articles such as a disk drive, disk drive magazine, flash or other solid state memory, optical or magnetic disk, such as a CD or DVD, just to name a few.

An auxiliary radio frequency memory device 104, in one embodiment, is parceled into three regions in which data can be stored; a medium device region which contains information such as a serial number, a device region which contains information from the tape drive such as load count, and host/vendor unique region wherein information such as history and/or performance data related to the cartridge 100 can be stored. The information in the regions can be added to with new information via an address related to the arrangement of available storage space in the auxiliary radio frequency memory device 104 or, optionally, the information can be read by an auxiliary memory reader, such as the reader 230, and reassembled with additional information and stored on the auxiliary radio frequency memory device 104 as the reassembled version, just to name two examples. In another example, if the storage limit is reached in the auxiliary radio frequency memory device 104, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3:
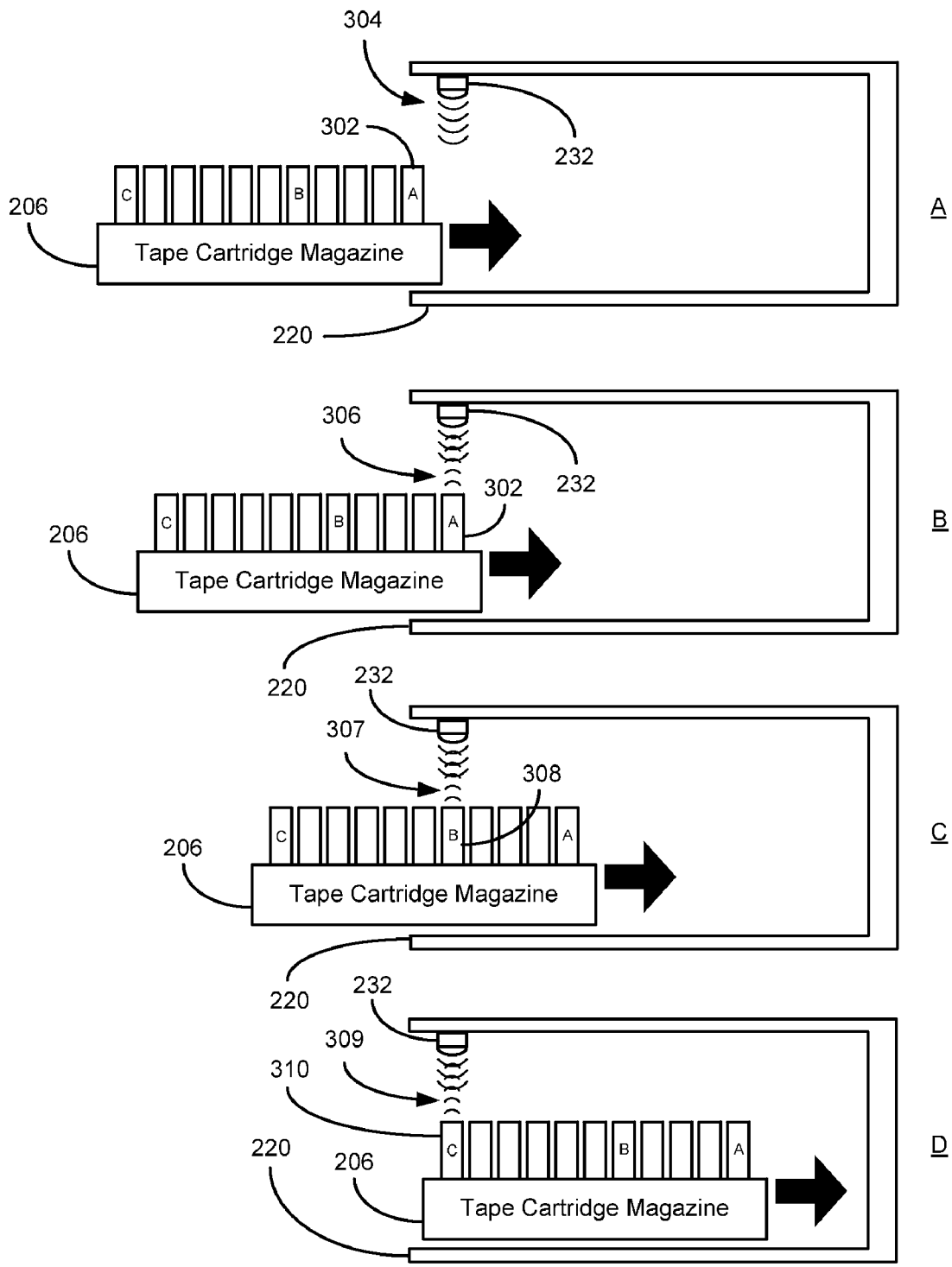
FIG. 3 is an illustration an embodiment of a shelf system that comprises an auxiliary memory reader that can be used in combination with a loaded tape cartridge magazine in accordance with an embodiment of the present invention.

FIG. 3 illustrates an embodiment of a shelf system 220 that comprises an auxiliary memory reader 232 that can be used in combination with a loaded tape cartridge magazine 206. As illustratively shown in arrangement-A, the tape cartridge magazine 206 is in the process of being moved on to the shelf 220 in the direction of the arrow. The auxiliary memory reader 232 is shown transmitting an RF field 304 via an auxiliary radio frequency memory device 104 contained in cartridge A 302. Arrangement-B illustrates the auxiliary radio frequency memory device 104 contained in tape cartridge A 302 transmitting data in the form of an RF signal 306 to the auxiliary memory reader 232 when positioned in the presence of the RF field 304. In one embodiment of the present invention, the auxiliary radio frequency memory device 104 is a passive device because it is energized when subjected to a strong enough RF field produced by the auxiliary memory reader 232. Information, such as storage capacity or available space, is transmitted between the auxiliary radio frequency memory device 104 and the auxiliary memory reader 232 via a specific radio frequency, shown here as 304 and 306. Data can be transferred and stored on the auxiliary radio frequency memory device 104 from the library 200 or alternatively (and in addition to) data from the auxiliary radio frequency memory device 104 can be transferred to the auxiliary memory 240 via the auxiliary memory reader 232. Arrangement-C illustrates the auxiliary radio frequency memory device 104 contained in tape cartridge B 308 transmitting data in the form of an RF signal 307 to the auxiliary memory reader 232 when positioned in the presence of the RF field 304. Arrangement-D illustrates the auxiliary radio frequency memory device 104 contained in tape cartridge C 310 transmitting data in the form of an RF signal 309 to the auxiliary memory reader 232 when positioned in the presence of the RF field 304.

Figure 4:
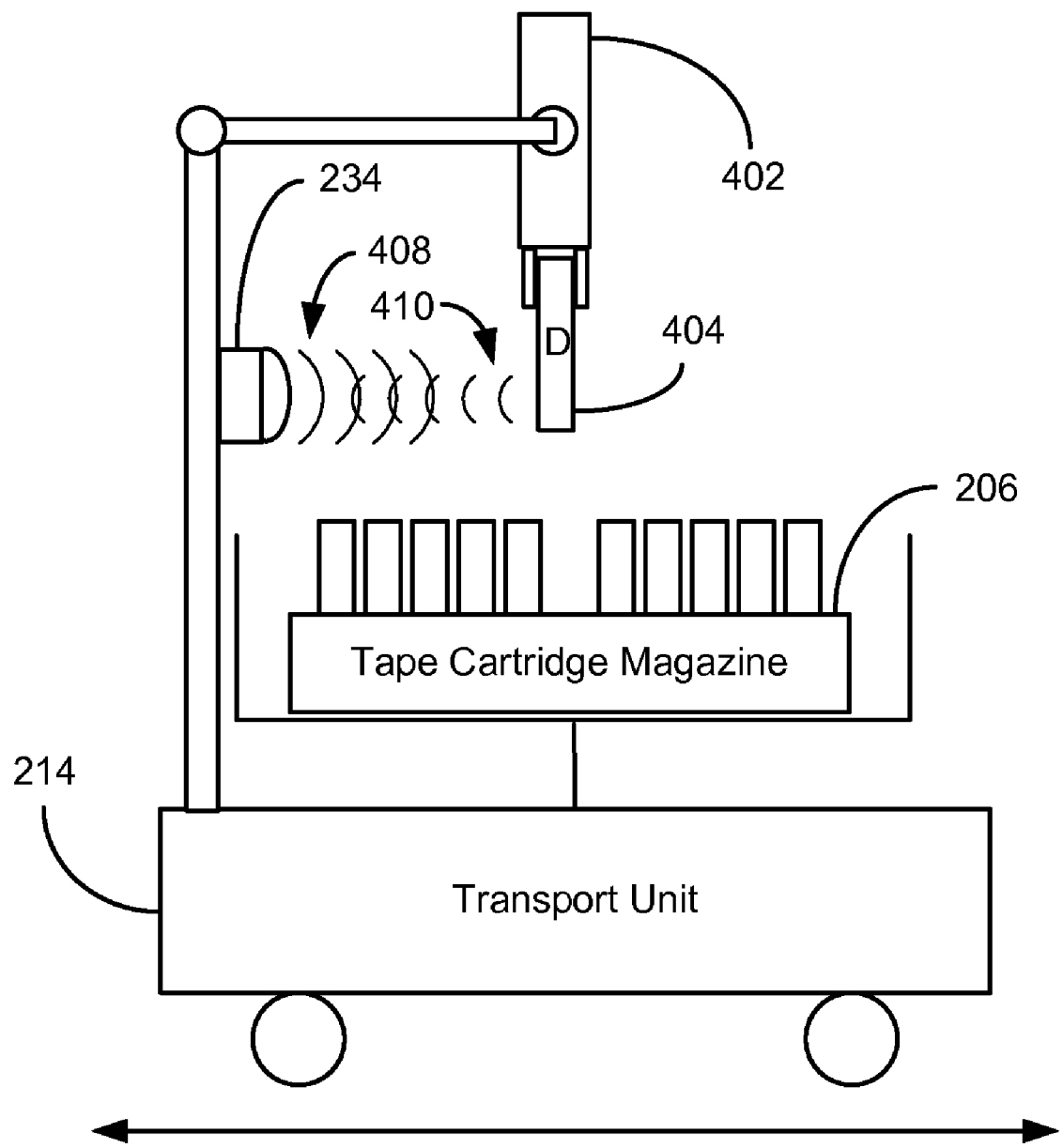
FIG. 4 is an illustration of a transport unit and auxiliary memory reader arrangement in accordance with an embodiment of the present invention.

With reference to FIG. 4, shown therein is an illustration of the transport unit 214, of FIG. 2, in greater detail. The transport unit 214 is adapted to transport tape cartridge magazines 206 within the library 200. A cartridge picker 402, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown herein accommodating an auxiliary memory reader 234 that is transmitting an RF signal 408 (and potentially data) to an auxiliary radio frequency memory device 104 contained in tape cartridge D 404 whereby the auxiliary radio frequency memory device 104 of cartridge D 404 is transmitting data via an RF signal 410 to the auxiliary memory reader 234.

Figure 5:
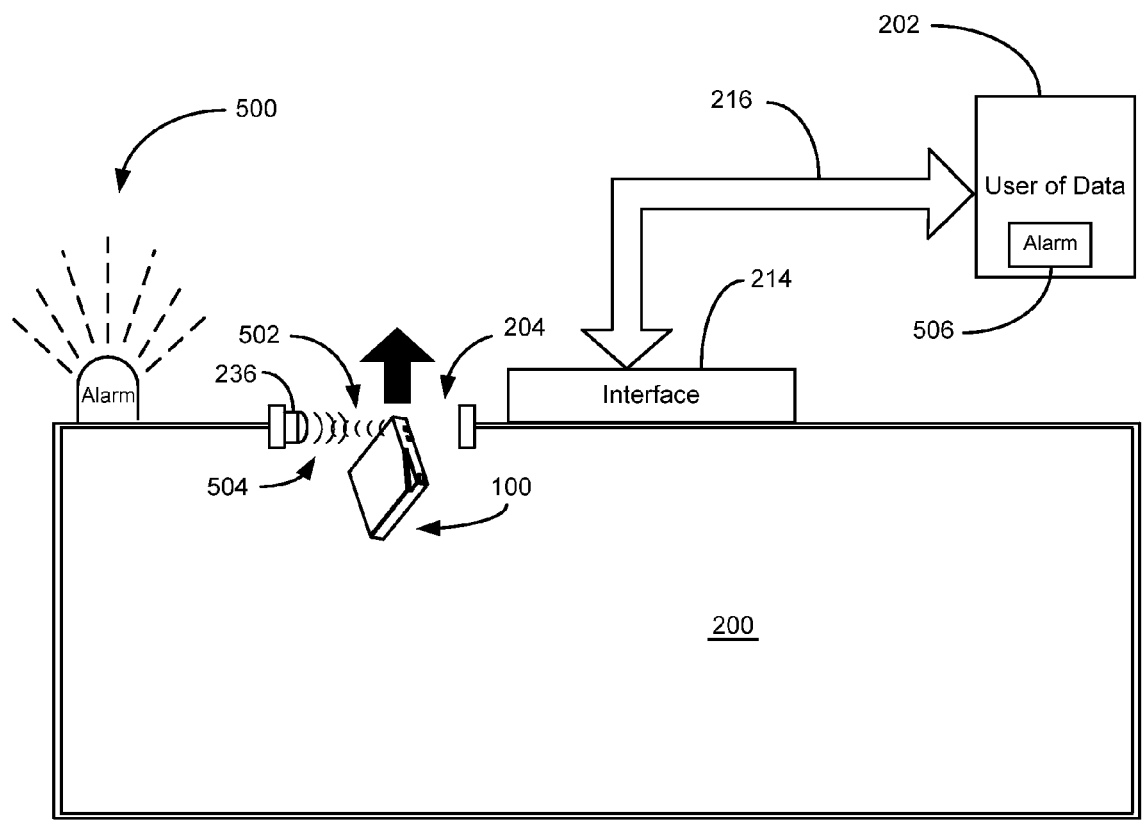
FIG. 5 shows an embodiment of an auxiliary radio frequency memory device reader located at the library entry/exit port location consistent with embodiments of the present invention.

FIG. 5 shows an embodiment of the present invention wherein an auxiliary radio frequency memory device reader 236 is capable of providing notice when a tape cartridge 100 is moved to an unintended location. In this embodiment, the library 200 provides an alarm system 500 that is activated when a tape cartridge 100 is moved to an unintended location, such as being moved out of the library 200 through the entry/exit port 204. As shown, the tape cartridge 100, and more specifically, the auxiliary radio frequency memory device 104 contained by the tape cartridge 100, transmits an RF response 502 when activated by the RF field 504 produced by the auxiliary radio frequency memory device reader 236. An algorithm associated with the library 200 can be initiated via the RF response 502 to determine if the tape cartridge 100 is authorized to pass through the entry/exit port 204. In the event of the tape cartridge 100 is displaced without authorization, the alarm 500 linked to the auxiliary radio frequency memory device reader 236 will activate. This measure can provide safeguard against stealing a tape cartridge 100 from the library 200 or inserting an unauthorized tape cartridge 100 having an auxiliary radio frequency memory device 104 into the library 200. In an alternative embodiment, the alarm 506 can be transmitted to a user of data 202 alerting that a tape cartridge 100 has been displaced without authorization. In yet another optional embodiment, one or more auxiliary radio frequency memory device readers (not shown) can be located in different places in or around the library 200 to indicate if a tape cartridge 100 is being moved to an unintended location. Such an arrangement can include a means to alert a user of data 202, or other authority, that something is out of order. In yet another embodiment, the auxiliary radio frequency memory device 104 associated with a tape cartridge 100 can be marked as "moved without authorization" or "stolen", etc. Optionally, alternative data, such as storage capacity and/or history/performance data related to the cartridge 100 can be obtained during passing passing of the cartridge 100 by the reader 236. Storage space on an auxiliary radio frequency memory device 104 is made available to a host, or user of data 202, in addition to space available for a drive device, such as tape drive 224, and tape cartridge 100. In some embodiments, the space for a host, referred to also as a host region, may contain attributes including, but not limited to, the date the media was generated, or manufactured, the time the cartridge was written (tape writing time), the time the cartridge was last accessed, a list of Single Character Display (SCD) at unload which is an indicia of potential errors with a drive and labeling field, such as a label tagged "Confidential Tape", library vital statistics, and other performance and/or historical event related data, for example. Library vital statistics can include data related to heat, humidity, voltage levels and the time of a certain activity level, etc.

In another embodiment of the present invention, a single bit of data, called a virgin bit, can be toggled in the auxiliary radio frequency memory device 104 when a tape cartridge 100 is used for the first time. A virgin bit can serve as an indicator that a tape has been used at least once which can reduce the number of new tape cartridges accidentally destroyed in the company of heavily used or damaged tape cartridges.

Data from each tape cartridge's auxiliary radio frequency memory device 104, obtained by an auxiliary radio frequency memory device reader, such as 230, 232, 234, or the like, can be stored on an auxiliary memory device 240 associated with the library 200. Optionally, the data can be stored in memory associated in an alternative location, such as with the host 202, for example. Because many potential attributes can be stored on an auxiliary radio frequency memory device 104, the manner in which the data can be displayed may be organized in accordance with specific needs. For example, each recorded cartridge can have an associated file where upon opening the file, one can choose which attribute to display. Alternatively, a display can include a handful of most frequently viewed data or data filtered according to specific performance related thresholds. Illustrative examples are shown in FIGS. 6A-6C.

Figure 6A:
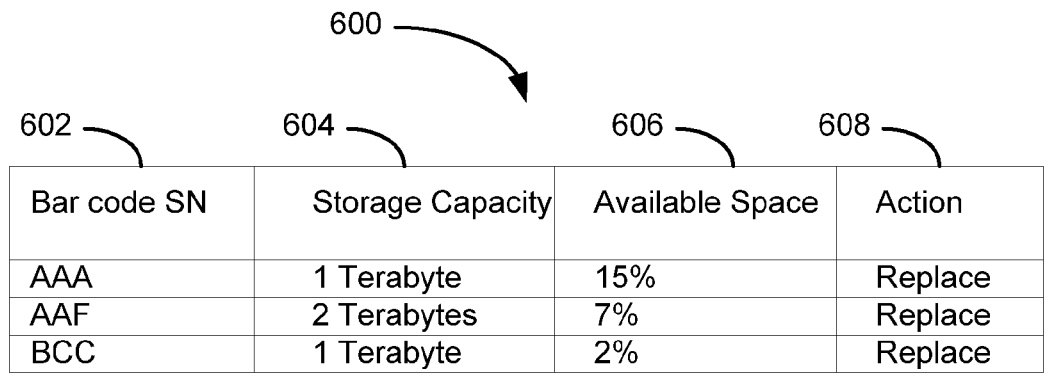

With reference to FIG. 6A, shown therein is one example of a displayed data table 600 pertaining to statistics such as storage capacity and available storage space related information contained in an auxiliary radio frequency memory device 104 stored on an auxiliary memory device, such as device 240. The displayed data table 600 can be viewed on the graphical user interface 218 or, optionally, on a monitor accessible by a user of data 202, just to name two viewing examples. The data is sorted by an action to replace a cartridge 608 which, in this example, is an exceeded threshold of available space remaining on a cartridge 100. As illustrated, four columns are displayed, namely; the tape cartridge bar code serial number 602, the storage capacity of a tape cartridge 604, the available storage space in a tape 606 and the action to replace a tape cartridge 608. Here, the minimum available storage space in a cartridge 100 that may alert a user of data 202 or a library operator is set at less than 150 Gigabytes of data remaining on a tape cartridge 100. As illustratively shown, bar code serial number AAA has an action to be replaced because of there are only 150 Gigabytes, or 15%, of available space remaining on the tape. Bar code serial number AAF has an action to be replaced because it only has 140 Gigabytes, or 7%, of available space remaining on the tape. Bar code serial number BCC has an action to be replaced because it only has 20 Gigabytes, or 2%, of available space remaining on the tape. A decision to replace the tape cartridge can be left up to an operator or end user or can optionally be automatically accomplished by the library 200. In an alternative embodiment, any tape with less than 15% available storage space (set as a threshold) may receive an action to replace, hence, under this condition, a 2 Terabyte tape would be replaced with 300 Gigabytes of available space remaining.

Figure 6B:
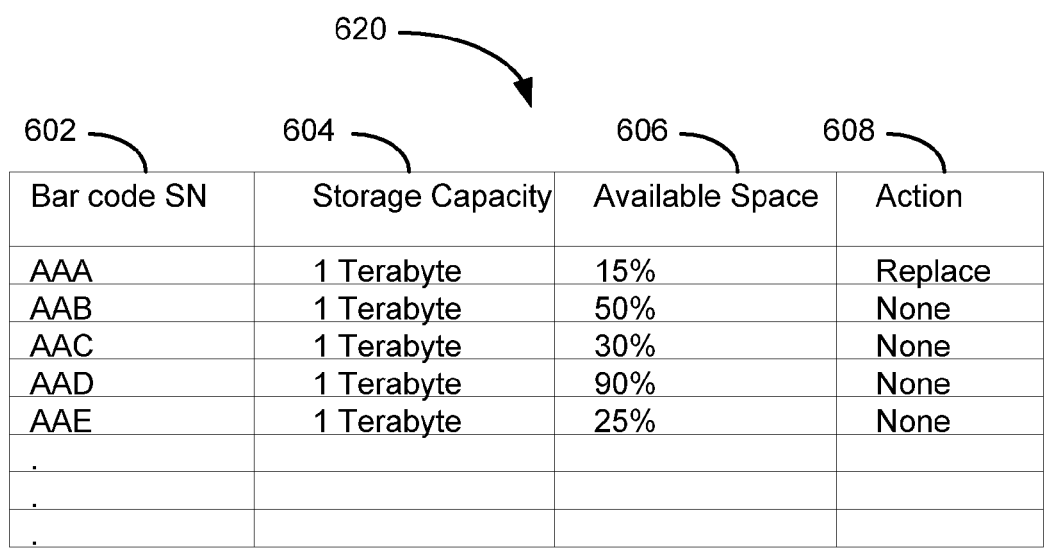

FIG. 6B shows an alternative example of a displayed data table 620 showing all tape cartridges in a library. As illustrated, four columns are displayed, namely; the tape cartridge bar code serial number 602, the storage capacity of a tape cartridge 604, the available storage space in a tape 606 and the action to replace a tape cartridge 608. In this example, all of the bar code serial numbers of all the tape cartridges 100 are displayed in succession in the bar code serial number column 602. As in FIG. 6A, cartridge bar code serial number AAA has an action to be replaced because of there are only 150 Gigabytes, or 15%, of available space remaining on the tape. Cartridge AAB has 50% available space remaining and, hence, there is no action needed regarding tape AAB. Likewise, tape cartridges AAC, AAD and AAE require no further action as their respective amount of available space are all under the threshold limits requiring further action.

FIG. 6C shows an alternative example of a displayed data table 640 showing capacity per tape cartridge magazine 206. As illustrated, four columns are displayed, namely; the magazine bar code serial number 642, the storage capacity of a magazine 644, the available storage space in a magazine 646 and the action to replace a magazine 648. In this example, all of the bar code serial numbers of all the magazines 206 are displayed in succession in the magazine bar code serial number column 642. Here, the minimum available storage space of a magazine 206 that may alert a user of data 202 or a library operator is set at less than 1 Terabyte of accumulated cartridge data storage space. As illustratively shown, magazine bar code serial number MAAA has an action to be replaced because of there are only 700 Gigabytes, or 7%, of available space remaining in the magazine. Magazine bar code serial number MAAF has an action to be replaced because it only has 800 Gigabytes, or 4%, of available space remaining in the magazine. Magazine bar code serial number BCC has an action to be replaced because it only has 200 Gigabytes, or 2%, of available space remaining in the magazine. A decision to replace a cartridge magazine can be left up to an operator or end user or can optionally be automatically accomplished by the library 200. In an alternative embodiment, any magazine with less than 10% available storage space (set as a threshold) may receive an action to replace, hence, under this condition, a 20 Terabyte magazine would be replaced with 2 Terabytes of available space remaining.

Figure 7:
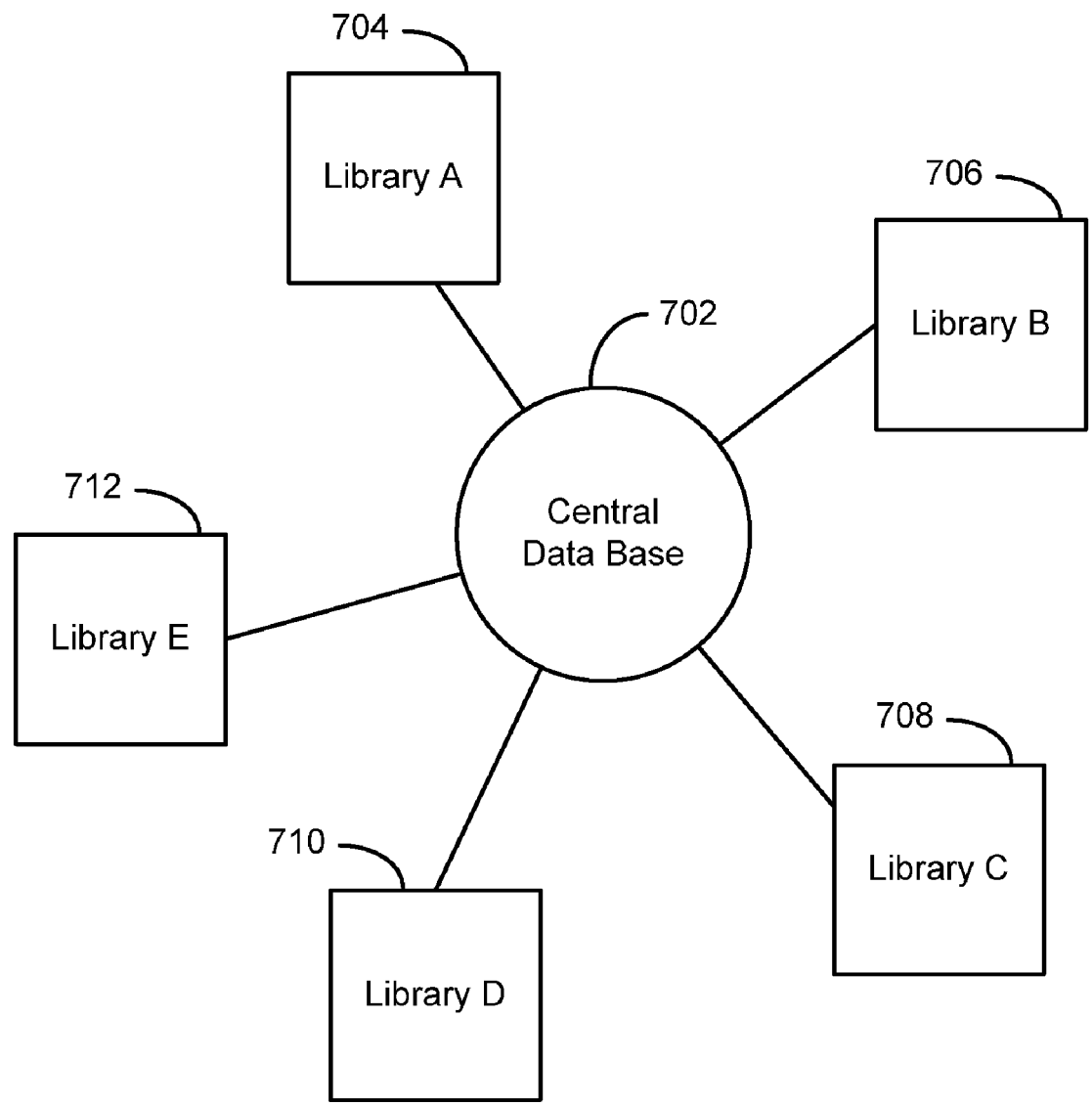
FIG. 7 is a block diagram illustrating a central data base acting as a repository for information pertaining to a plurality of tape cartridges in a plurality of libraries in accordance with an embodiment of the present invention.

FIG. 7 is a block diagram illustrating a central data base 702 acting as a repository for information pertaining to at least some of the tape cartridges 100 or at least some of the magazines 206 associated with each library. As shown in the illustrative arrangement, library A 704, B 706, C 708, D 710 and E 712 are each linked to the central data base 702. The central data base 702 can provide storage of any, and all, auxiliary radio frequency memory device information contained in each tape cartridge, or optionally each magazine 206 via a magazine auxiliary radio frequency memory device 272, associated with each library A-E 704-712. In one embodiment, all of the tape cartridges 100 and/or magazines 206 comprised by library A 704 may each comprise an auxiliary radio frequency memory device, such as the device 104 or 272, respectively. The central data base 702 can, therefore, contain all of the information from each of the auxiliary radio frequency memory devices from library A 704 and further be adapted to sort the information in any number of ways including the exemplary arrangements of FIGS. 6A-6C. Library B 706 may comprise tape cartridges or magazines that do not have an auxiliary radio frequency memory device, thus, only those that do have an auxiliary radio frequency memory device can store associated information on the central data base 702. Library C 708 may include some cartridges 100 and/or magazines 206 with an attribute associated with each auxiliary radio frequency memory device that bars storing any associated information on the central data base 702, hence, only those cartridges that are allowed to be stored (i.e., not barred) on the central data base 702 are stored. The auxiliary radio frequency memory device information stored on the central data base can be viewed by an authority, such as an Original Equipment Manufacturer of libraries and/or tapes, for purposes of tape management, such as replacing tape cartridges 100 or magazines 206 that do not have sufficient remaining available storage space.

Figure 8:
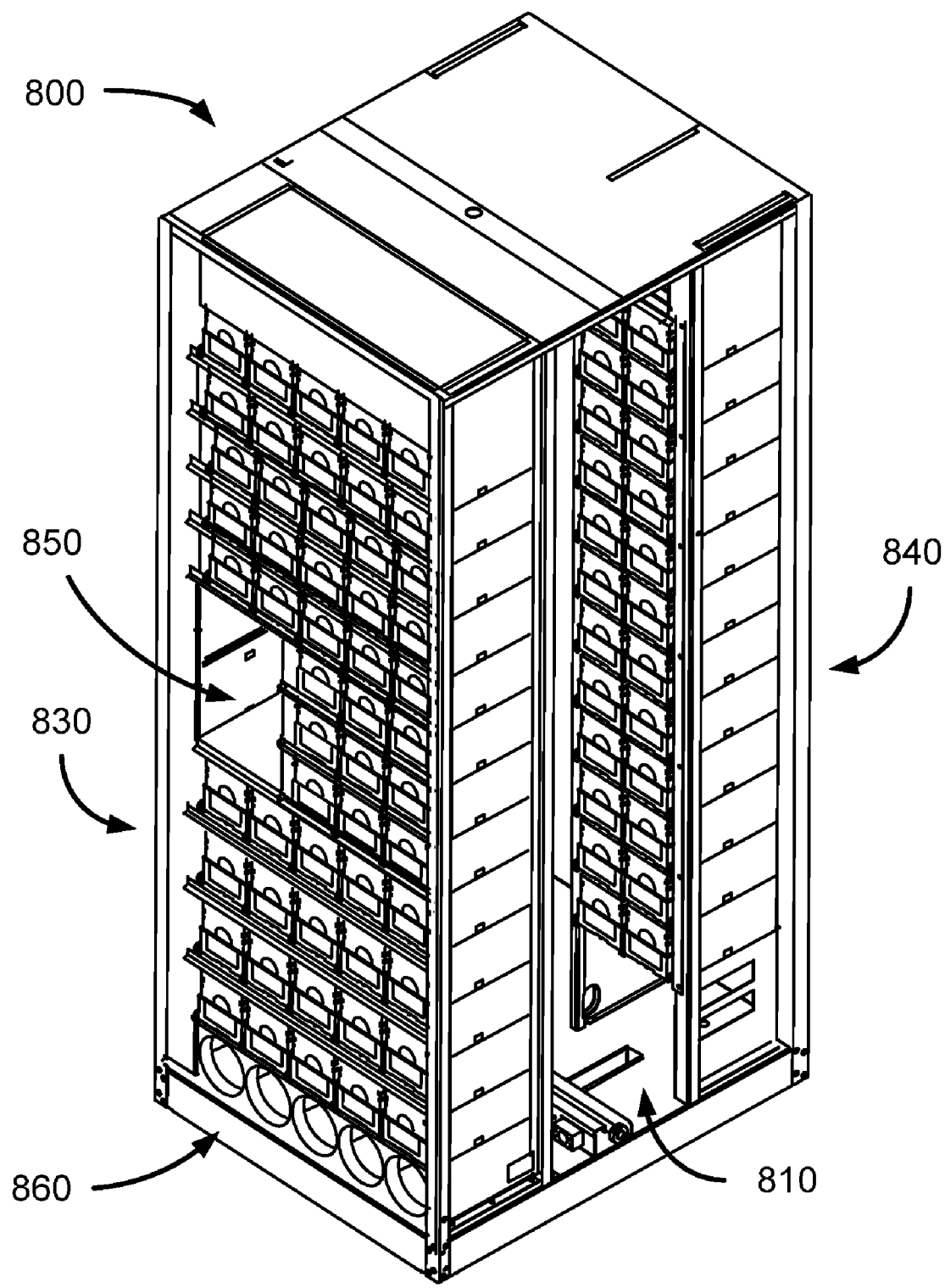
FIG. 8 shows a commercial embodiment of one T-950 library unit wherein aspects of the present invention can be practiced.
Figure 9:
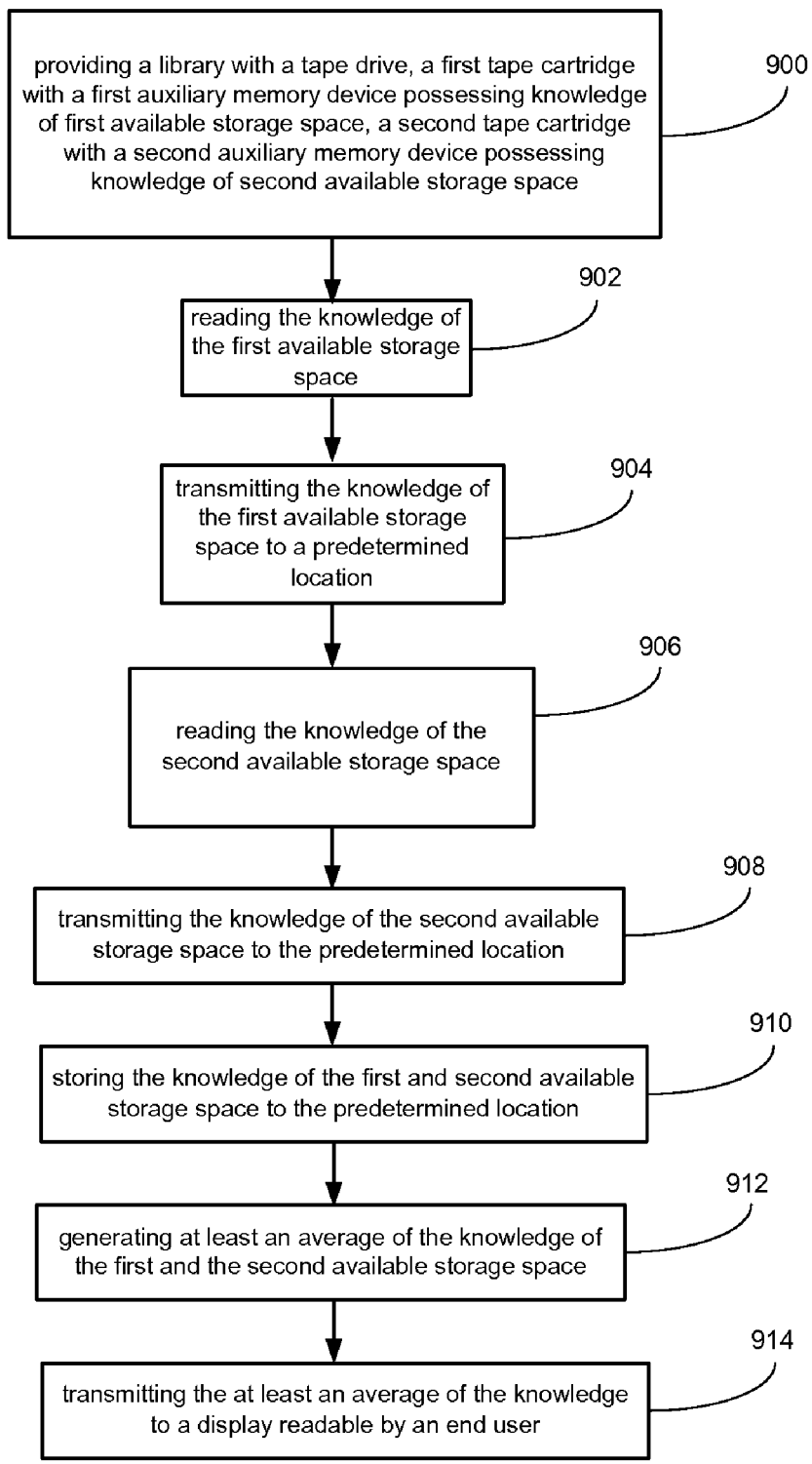
FIG. 9 is a block diagram illustrating a method to practice an embodiment of the present invention.

Embodiments of the present invention can be commercially practiced in a Spectra Logic T-950 tape cartridge library manufactured by Spectra Logic of Boulder Colo. FIG. 8 shows a commercial embodiment of one T-950 unit 800 without an enclosure. The T-950 library 800 comprises a first and second shelf system 830 and 840 that are adapted to support a plurality of the mobile media, such as the tape cartridge magazine 206 comprising a plurality of LTO-3 tape cartridges with MAMs, archived by the library 800. The shelf systems 830 and 840 can each comprise at least one auxiliary memory reader, such as the auxiliary memory reader 232 of FIG. 2A. Furthermore, the second shelf system 840 comprises at least one drive (not shown) adapted to read and write data to and from a tape cartridge and MAM data to and from a cartridge MAM (auxiliary memory device 104). Functionally interposed between the first and second shelf system 830 and 840 is a magazine transport space 810. The magazine transport space 810 is adapted to provide adequate space for a tape cartridge magazine 206 to be moved, via a magazine transport and cartridge picker (not shown), from a position in the first shelf system 830, for example, to a drive. The magazine transport and picker can further accommodate at least one auxiliary radio frequency memory device reader, such as the reader 234 from FIG. 2A. Tape cartridge magazines 206 can be transferred into and out from the T-950 library 800 via an entry/exit port 850. An auxiliary radio frequency memory device reader, such as the reader 236 from FIG. 2A, can be associated with the entry/exit port 850. Transferring tape cartridge magazines 206 in and out of the T-950 library 800 can be accomplished by an operator for example. The T-950 library 800 comprises a means for cooling as shown by the fans 860, located at the base of the library 800. The T-950 library 800 can be linked to a central data base, such as the data base 702, wherein the central data base can provide storage of all of the auxiliary radio frequency memory devices, such as devices 104 and 272, contained in each tape cartridge and magazine in the T-950 library 800 as read by any one of the auxiliary radio frequency memory device readers. The T-950 library 800 also provides a graphical user interface (not shown) whereon a display table much like those illustrated in FIGS. 6A-6C can be displayed. In an alternative embodiment, simple messages pertaining action associated with a tape cartridge and/or magazine can be displayed, such as an alert accompanying a sound alarm, for example. Referring now to FIG. 9 in conjunction with FIGS. 2A and 2B, shown therein is a method to practice an embodiment of the present invention. It should be recognized that the steps presented in the described embodiments of the present invention do not necessarily require any particular sequence. Though the steps shown in this embodiment are directed to a single tape cartridge 100, these steps are intended to be accomplished with a plurality of tape cartridges 100. As shown in step 900, a library 200 is provided with a tape drive 224, an auxiliary memory transfer device 230, 232 or 234, and a first and second tape cartridge, such as tape cartridge 207, that each possess a storage medium 102 and an auxiliary memory device 104 wherein the auxiliary memory device 104 contains knowledge of consumed storage space, Region B 205, and available storage space, Region A 203, associated with the tape storage medium 102. As shown in steps 902 and 904, the knowledge of the first cartridge's available storage space is read and transmitted to a predetermined location, such as the auxiliary memory 240. Other embodiments of a predetermined location can include a designated memory device comprised by the library 200, a shared memory device comprised by the library 200 and used by an outside user, a designated memory device in a location external to the library 200, a shared memory device in a location external to the library 200 wherein more than one user can access the shared memory device, a user of data, a display screen and a printout, just to name a few examples. As shown in steps 906 and 908, the knowledge of the second cartridge's available storage space is read and transmitted to the predetermined location. As shown in step 910, the knowledge of the first and second available storage space stored to the predetermined location. As shown in step 912, at least an average of the knowledge of the first and the second available storage space is generated, such as by an algorithm in the library 200 linked to the predetermined location, for example. As shown in step 912, the average of the knowledge is transmitted to a display readable by an end user 202 or operator, for example.

Figure 10:
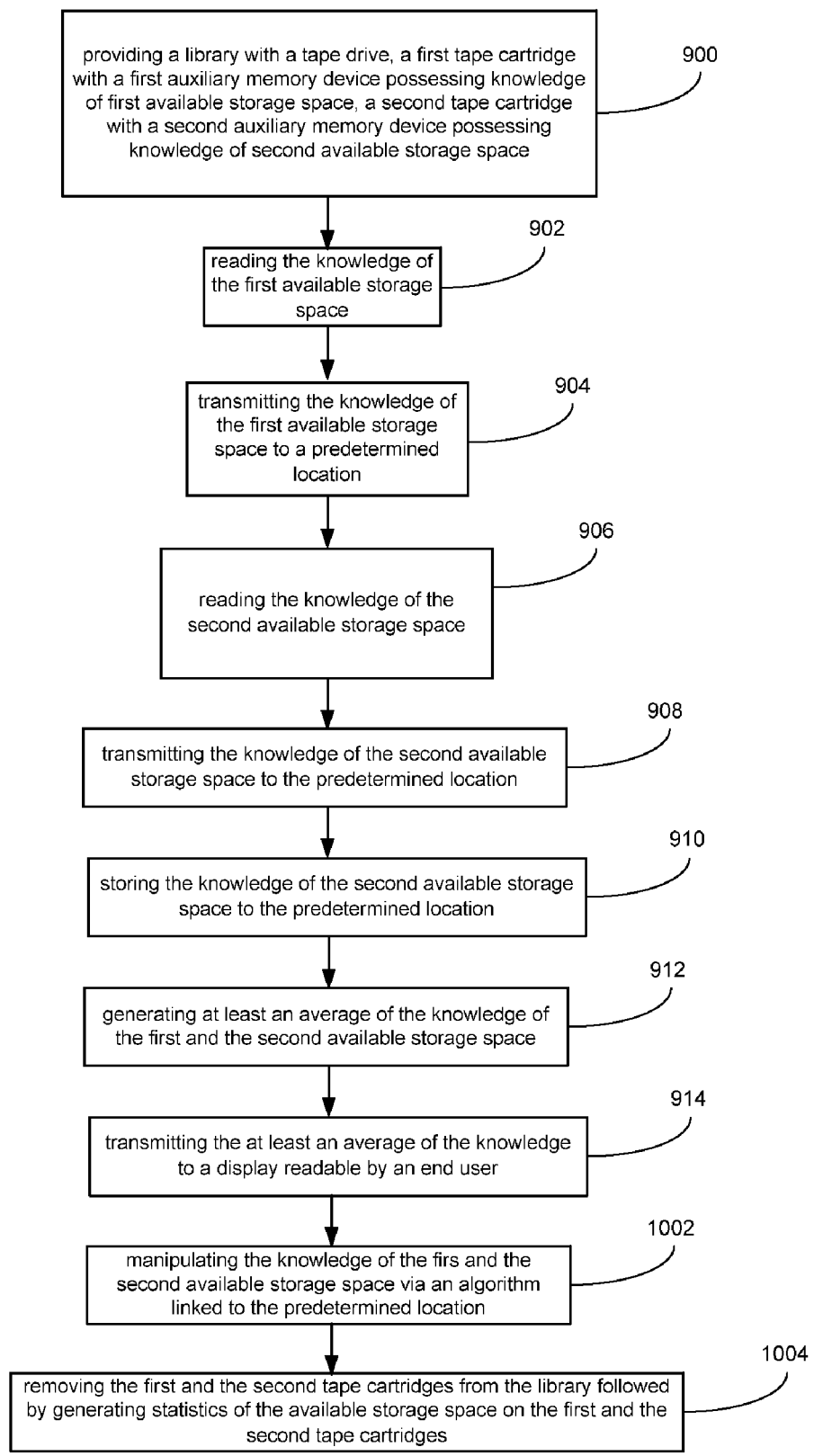
FIG. 10 is a block diagram illustrating an alternative method to practice an embodiment of the present invention.

FIG. 10 shows some alternative embodiments of the present invention which includes method steps 902, 904, 906, 908, 910, 912 and 914 from FIG. 9. For the embodiment in step 1002, the knowledge of the available storage space from at least the first and the second the tape cartridges are manipulated via an algorithm linked to the predetermined location, such as to generate statistical information, i.e., averages, etc. For the embodiment of step 1004, the first and second tape cartridges are removed from the library 200 and statistics are then generated relative the available storage space of the cartridges. In an alternative embodiment, the statistics generated of available storage space relative the cartridge/s can be done while the tape cartridges are in the library 200. The statistics can be sent to a user of data 202 or some other interested party. In an alternative embodiment, an auxiliary radio frequency memory reader device not associated with a tape drive, such as the auxiliary radio frequency memory device reader 236, can read the information from the tape cartridges 100 as they are removed from the library 200 via the entry/exit port 204 for example. Step 1004 n yet another It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple non tape drive auxiliary memory reader devices can be used inside of a library with one or more tape cartridge's associated auxiliary memory device at the same time while still maintaining substantially the same functionality without departing from the scope and spirit of the present invention. Another example can include using non tape drive auxiliary memory reader devices to check accuracy of data via redundancy not to mention techniques in which data from multiple tape cartridges, via their associated auxiliary memory devices, can be accumulated coincidentally, just to name a few examples while still maintaining substantially the same functionality without departing from the scope and spirit of the present invention. Further, though elements and methods are described herein exemplifying a first and second object or element, for example, this language is used herein to simplify the description indicative of a plurality of objects or elements. Finally, although the preferred embodiments described herein are directed to tape library systems and RF devices, and related technology, it will be appreciated by those skilled in the art that the teachings of the present invention can be applied to other remote communication systems and devices, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A tape storage library comprising:
 a plurality of tape cartridges each substantially housing a tape medium with a known storage capacity, said known storage capacity comprising consumed storage space and available storage space wherein said consumed storage space contains previously stored user data and said available storage space is available for storing new user data, and wherein each of said tape cartridges possesses an associated auxiliary memory device;
 at least one tape drive capable of cooperating with each of said plurality of tape cartridges to write said new user data to said tape medium housed in each of said tape cartridges and capable of transferring knowledge of said available space to said auxiliary memory device associated with each of said tape cartridges;
 a designated memory device for receiving and storing said knowledge from said auxiliary memory device associated with each of said tape cartridges; and an informing means for providing collectively said knowledge of said available storage space for at least two of said plurality of tape cartridges to a user of data.

2. The tape storage library of claim 1 wherein said informing means provides said knowledge of all of said plurality of tape cartridges to said user of data.

3. The tape storage library of claim 2 further comprising an algorithm capable of manipulating said knowledge stored in said designated memory device.

4. The tape storage library of claim 3 further comprising a display device capable of displaying said available storage space corresponding to all of said cartridges disposed in said library to said user of data.

5. The tape storage library of claim 3 wherein said user of data is associated with a first library partition, said first library partition comprises a percentage of said cartridges, said available storage space corresponding to said percentage of said cartridges is provided to said user of data.

6. The tape storage library of claim 2 wherein said designated memory device possesses a record of said information from all of said plurality of tape cartridges that are removed from said library.

7. The library of claim 6 wherein said library generates at least one statistic of collective available storage space from all of said removed tape cartridges.

8. The library of claim 7 wherein said at least one statistic is made available to said user of data.

9. The library of claim 8 wherein said at least one statistic comprises an average consumption percentage of at least two of said removed tape cartridges.

10. The library of claim 9 wherein said library comprises an algorithm uses said at least one statistic to minimize said available storage space on each of said cartridges disposed in said library.

11. The tape storage library of claim 1 wherein said auxiliary memory data transfer device is disposed in a location other than said at least one tape drive.

12. A tape storage library comprising:
a first tape cartridge and a second tape cartridge each possessing a tape medium with known storage capacity, said known storage capacity comprising consumed storage space and available storage space, each of said tape cartridges further possessing an auxiliary memory device adapted to acquire and maintain knowledge of how much available storage space exists on each of said tape cartridge;
at least one tape drive capable of writing new user data to said tape media associated with said first and second tape cartridges; and
a means for providing said knowledge from said auxiliary memory device associated with said first tape cartridge and said auxiliary memory device associated with said second tape cartridge to a user of data wherein said knowledge is in a cumulative form.

13. The tape storage library of claim 12 further comprising a third and a fourth tape cartridge possessing substantially the same construction as said first and second tape cartridges wherein a statistical analysis of said available storage space and said consumed storage space is performed collectively for all of said knowledge of all of said tape cartridges.

14. The tape storage library of claim 13 wherein said first tape cartridge and said second tape cartridge are associated with a first library partition and said third tape cartridge and fourth tape cartridge are associated with a second library partition, said first user of data is provided with a statistical analysis of at least said available storage space of said cartridges associated first partition.

15. A method comprising the steps of:
providing a library with a tape drive, a first tape cartridge with a first auxiliary memory device possessing knowledge of first available storage space, a second tape cartridge with a second auxiliary memory device possessing knowledge of second available storage space;
reading said knowledge of said first available storage space;
transmitting said knowledge of said first available storage space to a predetermined location;
reading said knowledge of said second available storage space;
transmitting said knowledge of said second available storage space to said predetermined location;
storing said knowledge of said first and said second available storage space to said predetermined location;
generating at least an average of said knowledge of said first and said second available storage space;
transmitting said at least an average of said knowledge to a display readable by an end user.

16. The method of claim 15 wherein said predetermined location is selected from a group consisting of: a designated memory device comprised by said library, a shared memory device comprised by said library, a designated memory device in a location external to said library, a shared memory device in a location external to said library, a user of data, a display screen, a printout.

17. The method of claim 15 wherein said generating step further includes said average of said knowledge of a third and fourth available storage space from a respective third and fourth tape cartridge.

18. The method of claim 17 further comprising manipulating said knowledge of said first, said second, said third and said fourth available storage space via an algorithm linked to said predetermined location.

19. The method of claim 17 wherein said third and fourth tape cartridges are assigned to a second partition and all of said knowledge of said available space related to said second partition is transmitted to a second user of data.

20. The method of claim 17 further comprising removing said first, said second, said third and said fourth tape cartridges from said library followed by generating statistics of said available storage space on said first, said second, said third and said fourth tape cartridges.

* * * * *